United States Patent [19]

Rogers

[11] Patent Number: 4,736,214

[45] Date of Patent: Apr. 5, 1988

[54] APPARATUS AND METHOD FOR PRODUCING THREE-DIMENSIONAL IMAGES FROM TWO-DIMENSIONAL SOURCES

[76] Inventor: Robert E. Rogers, 847 N. Hollywood Way, Burbank, Calif. 91505

[21] Appl. No.: 755,438

[22] Filed: Jul. 16, 1985

Related U.S. Application Data

[63] Continuation-in-part of Ser. No. 569,273, Jan. 9, 1984, abandoned.

[51] Int. Cl.⁴ .......................................... G02B 27/24
[52] U.S. Cl. ........................................ 353/10; 353/30; 353/98
[58] Field of Search ............... 353/10, 30, 31, 37, 353/94, 98, 99, 28; 350/144, 174, 169; 358/88, 89, 91; 272/8 P, 10; 352/43, 48, 60, 61, 63, 86, 88, 89

[56] References Cited

U.S. PATENT DOCUMENTS

| | | |
|---|---|---|
| 1,636,834 | 7/1927 | Peters et al. |
| 2,054,414 | 9/1936 | Fleischer ......................... 362/88 X |
| 2,727,429 | 12/1955 | Jenkins ........................... 352/89 |
| 3,180,211 | 4/1965 | Armstrong ..................... 353/10 |
| 3,182,547 | 5/1965 | Armstrong ..................... 352/86 X |
| 3,336,508 | 12/1967 | Smith et al. |
| 3,493,290 | 2/1970 | Traub . |
| 3,506,351 | 4/1970 | Geitz ............................... 353/37 X |
| 3,515,454 | 6/1970 | Paganelli . |
| 3,551,043 | 12/1970 | Neuberger . |
| 4,190,856 | 2/1980 | Ricks . |
| 4,306,768 | 12/1981 | Egging ........................... 353/28 X |

FOREIGN PATENT DOCUMENTS

| | | | |
|---|---|---|---|
| 831966 | 6/1938 | France ............................. 353/37 |
| 23623 | of 1910 | United Kingdom ............ 353/37 |
| 19823 | of 1911 | United Kingdom ............ 353/30 |

Primary Examiner—Harry N. Haroian
Attorney, Agent, or Firm—Nemschoff & Supnik

[57] ABSTRACT

A three dimensional image generating system has a multiple adjacent image generating projector aimed at corresponding juxtaposed reflectors, one of which being substantially reflective and the other of which being partially transmissive and partially reflective. A third partially transmissive reflecting member is interposed between the juxtaposed reflectors and a viewing audience. A prop supporting rotatable stage is disposed before the audience and beyond the the third reflecting member. The third reflecting member transmits and reflects to the audience a composite image composed of the three dimensional image generated by the juxtaposed reflectors and the prop image passed through the third reflecting member.

18 Claims, 3 Drawing Sheets

APPARATUS AND METHOD FOR PRODUCING THREE-DIMENSIONAL IMAGES FROM TWO-DIMENSIONAL SOURCES

CONTINUATION-IN-PART

This application is a continuation-in-part of copending application Ser. No. 569,273, filed Jan. 9, 1984, now abandoned.

BACKGROUND OF THE INVENTION

1. Field of the Invention

The present invention generally relates to methods of reproducing visual images, and more particularly, to those methods for reproducing visual images in three-dimensional form.

2. General Background

A number of methods for producing three-dimensional images from two-dimensional means have existed. These fall into two groups: the "stereoscope method" group and the "Pepper's Ghost" method group. One of the first methods of producing a three-dimensional effect employed a device called a stereoscope. This device employed a method whereby two photographs of the same scene were taken at slightly different angles and were viewed through two eye pieces. The apparatus and methods for producing three-dimensional effects progressed through a phase whereby the two images were projected side by side onto a screen. Members of the audience held stereoscope type viewers in their hands and aimed at the screen, aligning them as best they could so that the right image came only to their eye while the image came only to their left eye.

A significant improvement was made with the "colored filter/glasses" method (a variation of the stereoscope method group) in which two black and white photographs of the same scene were taken at slightly different angles. Two projectors were used, one projecting the right image and the other projecting the left image. The two projectors were aligned with respect to the screen so that their images were superimposed over each other on the screen.

Over the lenses of the projectors were placed an unmatched set of colored filters, each filter passing a narrow range of wavelengths of light while blocking other wavelengths. The set of filters were "unmatched" in that each passed a range of wavelengths exclusive of the range passed by the other.

An identical set of unmatched colored filters were given to the audience for use as glasses, each filter passing a narrow range of wavelengths of light, each exclusive of the other. The filter over the audience's right eye matched the filter on the right projector. The filter over the audience's left eye matched the filter over the left projector.

Thus, on leaving the right projector, the right image was "colored" to a narrow range of wavelengths of light which would, after bouncing off the screen, pass through the filter on the right eye of the audience's glasses and enter the right eye and thus be seen by the right eye but not enter the filter over the left eye and therefore not be seen by the left eye. Conversely, on leaving the projector the left image was "colored" to a narrow range of wavelengths of light which would, after bouncing off the screen, pass through the filter on the left eye of the audience's glasses and enter the left eye and therefore be seen by the left eye but not enter the filter on the right eye of the audience's glasses and therefore not be seen by the right eye.

Thus, through the use of these colored projector filters and colored glasses, each eye would see a separate image, producing a stereoscopic effect.

With the development of polarizing materials, a significant advance was made in the ability to project three-dimensional images in color. Two separate images were photographed in color, from slightly different angles, one for the viewer to see through his right eye, one image to be seen through the left. The separate images were projected through respective lenses on to a screen where they were superimposed, one upon the other. Polarizing filters were placed over the film projector lenses and adjusted so that the polarizing axis of one polarizing filter was displaced by 90 of arc from the polarizing axis of the other. The viewer uses specially prepared polarized glasses with each of the lenses being polarized to match the process initiated at the projector. For example, the right lens of the audience's glasses was polarized vertically so as to receive only the vertically polarized light from the right projector; the left lens of the audience's glasses was polarized horizontally so as to receive only the light waves from the projector which were oriented horizontally. Thus, through the use of polarizing lenses, each eye would see a separate image producing a stereoscopic effect. It is important to note that all of the prior art methods above (the stereographic method group) have the advantages of being able to use still pictures, motion pictures or video pictures as their images sources but all of the prior art methods above have the distinct disadvantage of requiring the audience to view the image through glasses or stereoscopes or some other device kept close to the face. This is inconvenient and uncomfortable for the audience. The glasses or other devices are expensive and their re-use by other audiences causes a potential health hazard.

Theatrical illusions have been created which give the viewer the effect of a three-dimensional scene. These are typically known as "Pepper's Ghost" or "Cabaret du Neant." The illusion is based on elementary optical effects. A viewer is place in a specific area and typically views fixed, three-dimensional theatrical sets, e.g., tables, chairs, through a reflective transplant medium such as glass. The reflective transparent medium through which the viewer sees the props is placed at an angle to the viewer to produce a reflecting surface. A lighted object which is to appear to be in the theatrical scene is placed out of sight of the viewer but is accurately placed such that the viewer sees the reflection of the lighted object via the reflecting medium. Since the reflection of the lighted object is from the reflection of the light from the surface of the transparent medium, the viewer will see a "virtual image" of the lighted object in juxtaposition with the theatrical props. The three-dimensional images created through the use of this illusion technique have inherent limitations. If the virtual image is to be three-dimensional, then the lighted object must be a solid three-dimensional object rather than a two-dimensional film or video image. This limitation substantially reduces the flexibility of the system since three-dimensional objects are more difficult and expensive to manipulate than are two-dimensional film or video images.

Some of these devices have used single projectors however, only a single image has been generated. When one image is seen directly and one seen by reflection, unevenness in illumination may result. Absorption filters have been used to prevent light contamination of the images, resulting from image generation along different axes. If multiple projectors, were used to create a multiple image synchronization would be required.

Devices have been suggested for three-dimensional television projection systems designed apparently for home viewing. Multiple television projection screens were used. They have required a positive lens to reposition the composite picture formed forward to a viewing audience. It does not appear that these are suitable for theatrical use before a significant live audience.

The present invention method substantially resolves the problems which are inherent in those methods disclosed in the prior art. No stereoscopic device or glasses are required yet three-dimensional images are created from two-dimensional images without the need for solid three-dimensional objects. Only a single projection source is required, limiting capital expenditures and eliminating the need for projection synchronization. Yet the invention is suitable for theatrical viewing before a stage audience. Moreover, the three dimensional image generated from the single two dimensional source may be integrated with three-dimensional images from a live stage which may use props or actors.

SUMMARY OF THE INVENTION

The present invention comprises apparatus and a method for producing a three-dimensional effect from two-dimensional image sources in the context of theatrical exhibition before a significant audience.

A projection source has multiple adjacent images projecting multiple images to spaced apart reflectors. A first reflector is substantially reflective and a second reflector is substantially transmissive. The transmission of the first and second projected images are correspondingly oriented to separately impinge on the first and second reflective surfaces. An audience viewing region is in spaced relationship to the reflectors to view the composite image.

More specifically, a projector having a single image projection source projects images on a rear projection screen from a media having corresponding adjacent images.

Additional features include a third reflecting member interposed between the audience region and the first and second reflecting members. The third reflecting is partially reflecting and partially transmitting to allow images from a stage beyond the third reflecting member to pass through the third reflecting member and be transmitted to the audience. A rotatable turntable stage allows multiple props for different scenes. A fourth partially reflecting member is interposed to include an integrated image of props reflected from beneath the fourth reflecting member and props or actors beyond the fourth reflecting member.

It is therefore an object of the present invention to provide an improved method for the generation of three-dimensional visual effects.

It is another object of the present invention to provided a method for producing three-dimensional visual effects from two-dimensional visual sources.

It is still another object of the present invention to provide three-dimensional visual effects from non-stationary two-dimensional visual sources.

It is still another object of the present invention to provided three-dimensional visual effects from standard, unmodified visual source projection equipment.

It is still another object of the present invention to produce three-dimensional visual effects without requiring the audience or observer to wear glasses or use any other apparatus on or near their eyes or face.

It is still yet another object of the present invention to implement a method for producing three-dimensional visual images which is simple and inexpensive to implement.

The novel features which are believed to be characteristic of the invention, both with further objectives and advantages thereof, will be better understood from the following description considered in connection with the accompanying drawings in which a presently preferred embodiment of the invention is illustrated by way of example. It is to be expressly understood, however, that the drawing is for purpose of illustration and description only and is not intended as a definition of the limits of the invention.

DETAILED DESCRIPTION

The present invention method employs two well-known optical principles to produce an effect which is substantially better than that disclosed in the prior art. An understanding of the principles of mirror symmetry and reflection and refraction can be best gained by reference to FIGS. 1 and 2 respectively. Referring initially to FIG. 2, when a ray of light (e) strikes the boundary surface 15 of two different transparent media, e.g., on passing from air 16 into a sheet of glass 17, a proportion of the light (r) is reflected back to the first medium. The remainder of the light penetrates into the second medium, but, due to refraction, it undergoes a change of direction. These two phenomena of reflection and refraction are shown in FIG. 2. The ray (r) is so reflected that the angle ($a_1$) which it forms with the perpendicular of incidence (l) (i.e., a line perpendicular to the boundary surface) is equal to the angle (a) formed by the incident ray (e) (angle of incidence equals angle of reflection). The incident ray (e), the perpendicular of incidence (l), the reflected ray (r), and refracted ray (g) are all situated in the same plane. The mathematical relation that exists between the angle of incidence (a) and the refraction angle (b) is known as the law of refraction.

Figure 1:
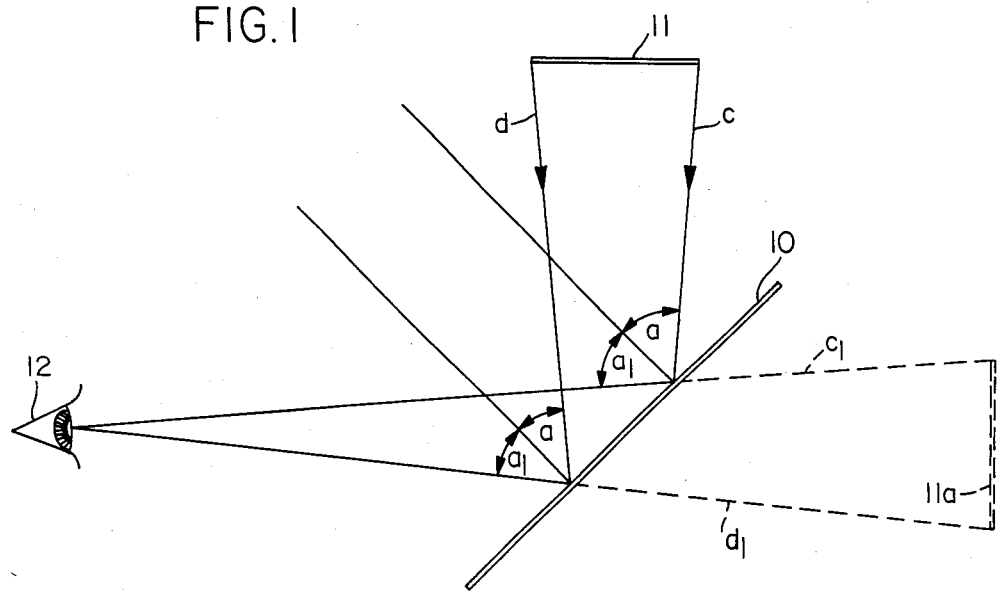
FIG. 1 illustrates the principle of mirror symmetry through the use of a reflecting surface.
Figure 2:
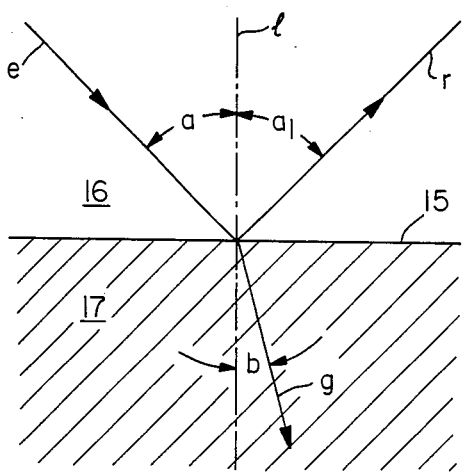
FIG. 2 illustrates the principle of light reflection and refraction where a ray of light strikes the boundary surface of two transparent media.

Referring now to FIG. 1, the principle of mirror symmetry can be best understood. Reflection occurs at smooth surfaces. In FIG. 1, reflecting surface 10 can be either a mirror or a transparent medium such as glass having a smooth surface. The law of reflection states: the incident ray, the perpendicular to the reflecting surface, and the reflected ray are situated in one plane. As shown in FIG. 1, the angles of reflection ($a_1$, $a_1'$) are equal to the respective angles of incidence (a, a'). Rays emerge from the object in all directions. In FIG. 1, object 11 is a two-dimensional object. If a beam of light rays from the object 11 is reflected by the reflecting surface 10, the rays will change their direction but will, after doing so, continue on their divergent paths. They do not converge and therefore do not produce a real image. In FIG. 1, the viewer 12 is situated at an oblique angle with respect to reflecting surface 10. Using the law of reflection, the pertinent visual boundary limits of object 11 are transmitted by rays (c) and (d) to be viewed by viewer 12. Object 11 will appear to be located at a point located behind reflecting surface 10, i.e., the virtual image 11a of object 11. The virtual image 11a is at the same distance behind the reflecting surface 10 as the object 11 is in front of it. In this case, the following relationship exists: $c=c_1$, $d=d_1$. As is obvious from the discussion relating to FIG. 2, where reflecting surface 10 is in fact a transparent medium such as glass, a portion of the incident light rays designated as (c) and (d) will be reflected through reflecting media 10 thereby producing a virtual image 11a which will be reduced in intensity from that which would be viewed if reflecting surface 10 was a mirror.

The present invention can be best understood by reference to FIGS. 3, 4, 5 and 6. As stated with respect to FIG. 2, the incident ray (e), the perpendicular of incidence (l), the reflected ray (r) and the refracted ray (g) are all in one plane. In the example shown in FIG. 3, it is intended to produce two virtual images 20i and 21i which are in parallel spaced relation to one another. Although the scope of the present invention would permit any special relationship to be formed, this has been selected for the purpose of example only. A pair of two-dimensional images are projected by televisions screen 20 and 21 which are understood to lie in separate planes. Despite the fact that the planar images designated by the reference numerals 20 and 21 have been defined as being projected by conventional televisions sets, it is understood that by any means which can generate two-dimensional images could be used. A reflecting, transparent member 22 is placed at an oblique angle with respect to the pair of two-dimensional images projection units 21 and 20. The principles of mirror symmetry dictate that when a virtual image of a planar image is seen via a flat reflecting surface, the angle between the virtual image and the reflecting surface. Therefore, the angle between the planar image and its virtual image can be selected by placing the reflecting surface at an angle with respect to the planar image equal to one-half the angle desired between the planar image and its virtual image. Since the planes of the two-dimensional image projection unites 20 and 21 are separated by 90 degrees of arc, reflecting surface 22 must be placed at an angle of 45 degrees with respect to image projection unit 20 in order to cause virtual images 20i and 21i to be parallel. As will be explained in detail hereinbelow, in this embodiment reflecting surface 22 must be transparent so that the viewer 23 will be able to see through reflecting surface 22 in order to see the reflected image from two-dimensional projection, the angle of the incident rays emanating from projection unit 21 are reflected from reflection unit 22. Since the angle of incidence is equal to the angle of reflection, the pertinent portion of the visual image 21a–21b is reflected from reflecting surface 22, the pertinent field of the reflected light field being defined by the reference numerals 21c and 21d.

The pertinent field of light emitted from two-dimensional source 20 is defined by reference numerals 20a and 20b. Since reflecting surface 22 is transparent, neglecting the minor offset caused by the index of refraction inherent in the transparent media which is used to fabricate reflecting surface 22, light rays 20a–20b will be reflected from the surface of reflecting surface 23, the pertinent field of the visual image being defined by reference numerals 20c and 20d. In addition, the reflected image projected from two-dimensional image source 21 will be reflected from reflecting surface 23, the pertinent field of the visual image being defined by the reference numerals 21e and 21f. In order to reduce the effect of a transparent medium's refractive qualities, transparent reflecting surface 22 should have the minimum thickness possible.

From a theoretical basis, it is irrelevant whether reflecting surface 23 is a mirror or a transparent medium having a smooth surface. Since the beam of light rays which are reflected from a reflecting surface will not coverage and therefore will not produce a real image, they will all appear to come from a point located behind reflecting surface 23, i.e., the virtual images of two-dimensional image sources 20 and 21 have been defined by the reference numerals 20i and 21i. The virtual images 20i and 21i are at the same distance behind the reflecting surface 23 as the image projecting sources 20 and 21 are in front of reflecting surface 23. Since the distance traveled from the projecting image source 21 to reflecting surface 23 is farther than the distance between projecting image source 20 and reflecting surface 23, the virtual image 21i will appear to be farther away from viewer 23 than virtual image 20i, the three dimensional spacing being defined by the reference numeral 24. As stated, the example shown in FIG. 3 was intended to define a method of projecting two images which would be in parallel spaced relation to one another. If the angle of reflecting surface 22 is altered with respect to the plane of image source 20 or 21, the special orientation between the planes of virtual images 20i and 21i will be changes.

Figure 3:
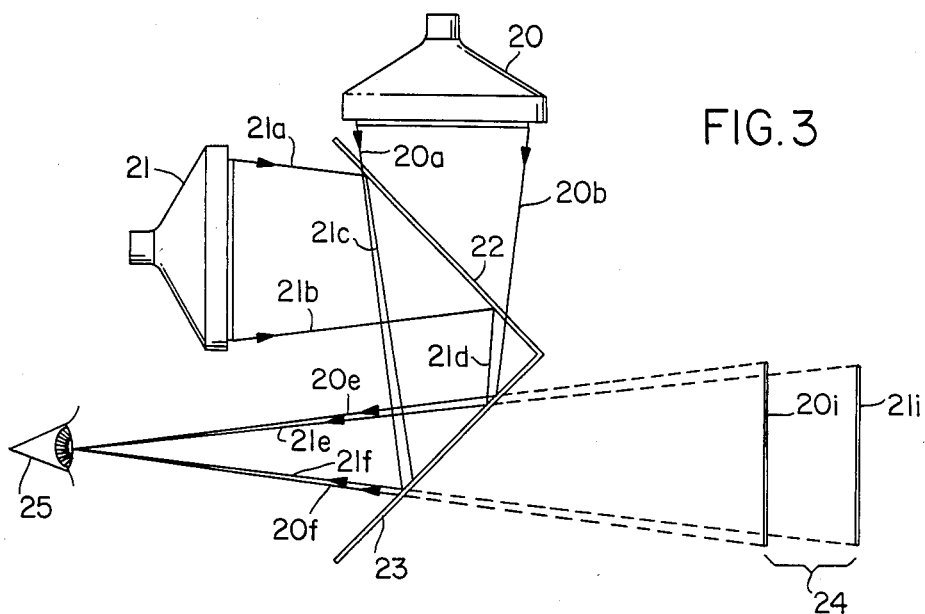
FIG. 3 illustrates schematically the present invention method for producing a three-dimensional effect from two-dimensional image sources not lying in the same plane.
Figure 4:
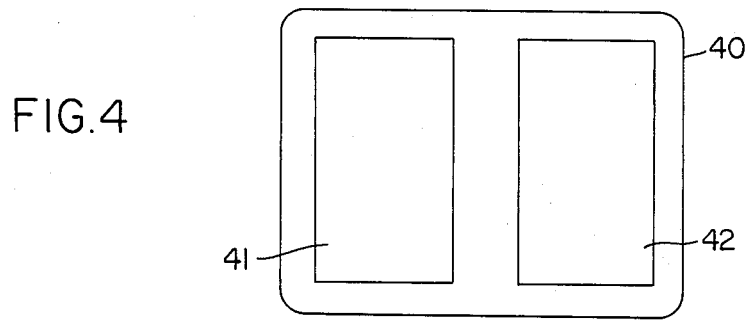
FIG. 4 illustrates schematically an exemplary pair of image sources produced on a single television screen.
Figure 5:
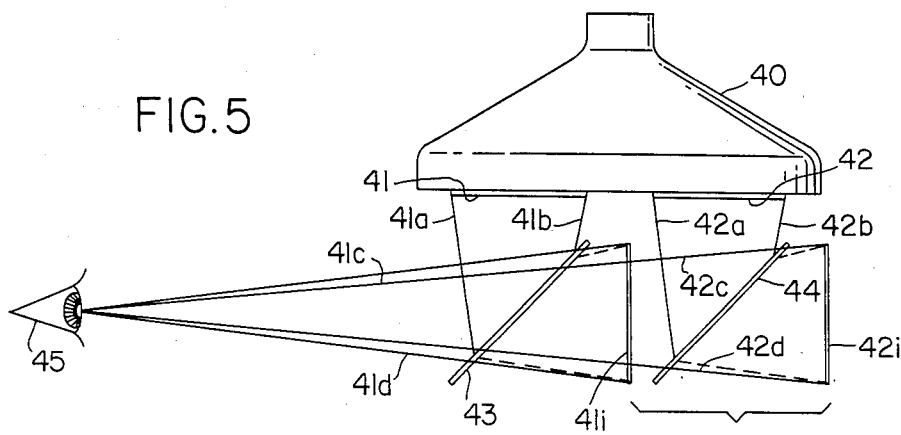
FIG. 5 illustrates a three-dimensional image produced from two visual image sources lying in the same plane.

Another embodiment of the present invention can be best understood by reference to FIGS. 4 and 5. As stated, it is an object of the present invention to provide a method of producing three-dimensional visual image based upon the projection of two or more two-dimensional images. FIG. 4 illustrates an exemplary procedure for producing a pair of two-dimensional images through the use of a single, conventional television screen 40. As shown in FIG. 4, television screen 40 utilizes a split screen technique which is well-known to those persons having skill in the art. Images 41 and 42 are in spaced relation from each other and lie in a single plane. This is contrary to the configuration shown in FIG. 3 which employs projected images 20 and 21 which were in planes that were separated by 90 degrees of arc. Schematically, FIG. 5 depicts the placement of a single television set 40 displaying images 41 and 42 in juxtaposition to a pair of reflecting surfaces 43 and 44. As mentioned, although the present invention method can combine virtual images of a plurality of projected objects in substantially any angular relationship desired, the example shown in FIG. 5 generates two virtual images 41i and 42i in parallel, spaced relation to one another. In order to carry out this exemplary procedure, reflecting surfaces 43 and 44 are disposed at approximately 45 degrees with respect to the plane of images 41 and 42 as well as being at approximately a 45 degree angle to the viewer 45.

Using the principles which have been described hereinabove, the pertinent definition of the image projected from image source 41 is defined by the reference numerals 41a an 41b and reflect from the smooth surface of reflecting surface 43 to viewer 45, the reflected rays being designate by the reference numerals 41c and 41d. Since the viewer 45 must see through reflecting member 43 in order to see the virtual image of image source 42 reflected via reflecting surface 44, reflecting member 43 is a transparent gloss having a smooth surface. In this manner, viewer 45 will see the reflected light of image source 42 through the transparent medium which creates reflecting surface 43. The effect of the index of refraction of reflecting member 43 will be described hereinbelow. As with projected image 41, the pertinent visual field of projected image 43 is defined by reference numerals 42a and 42b, viewer 45 receiving the reflected rays, the boundary limit being defined by the reference numerals 42c and 42d.

As has been described, reflections from a mirror or other smooth surface appear to come from a point located behind the respective reflecting surface and thereby produce a virtual image of the object which is at the same distance behind the reflecting surface as the object is in front of it. In this case, the virtual image of projected image 41 is defined by the reference numeral 41i and lies as far behind reflecting surface 43 as projected image 41 is in front of reflecting surface 43. In a manner, virtual image 42i appears to lie as far behind reflecting surface 44 as projected image 42 is in front of reflecting surface 44. In this case, reflecting surface 44 can be fabricated from a mirror or any other reflecting surface.

As explained in connection with FIG. 2, where an incident ray of light (e) passes from one transparent medium to another, a portion of the light will penetrate into the second medium upon striking the boundary layer. As was shown in FIG. 2, when the incident light ray (e) strikes boundary surface 15, a refracted light ray (g) will penetrate the surface of glass member 17. In either of the examples shown in FIG. 3 or FIG. 5, it is necessary that light rays pass through the respective reflective surfaces. In FIG. 3, the image projected from image projection source 20 must pass through reflecting surface 22 to be reflected from reflecting surface 23. In a like manner, the projected image from image source 42 must be reflected by reflecting source 44 and then pass through reflecting surface 43. In both cases, the light which must pass through the glass will be refracted and will therefore emerge in rays approximately parallel to and in the same plane as the approaching rays, depending on the degree of optical perfection of the glass. As discussed hereinabove, a primary method for reducing the effect of the index of refraction of reflecting surfaces 22 or 43, or any other transparent medium are to: (1) use the most optically perfect transparent reflecting medium; and (2) reduce the thickness of the transparent elements as much as possible.

Figure 6:
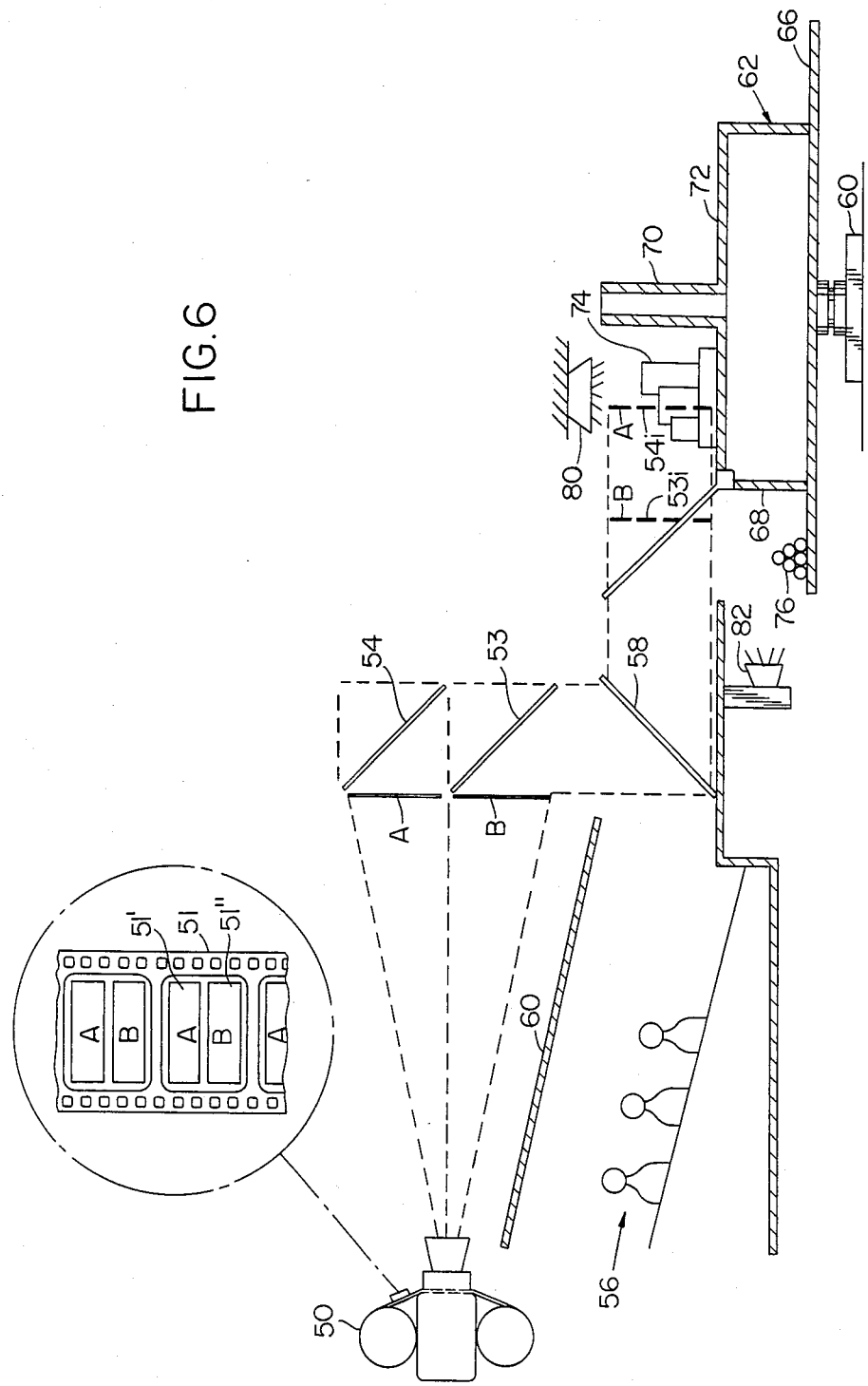
FIG. 6 illustrates schematically the present invention for delivery to an audience an integrated three-dimensional effect from a two-dimensional image source and a stage and prop arrangement.

With particular reference to FIG. 6, a system and method is shown suitable for the theatrical exhibition. A motion picture projector 50 is shown schematically having a projectable media 51. The projectable media 51 is typically ordinary 35 mm film, yet each frame, having an ordinary projection aspect ratio for the combined frame, yet having upper and lower planar images A and B indentified as 51', 51''. The separate corresponding images 51', 51'' represent spacially separated images, that is those images photographed from spacially separated positions in order to generate a projected image of multiple dimensional effect. Since the upper and lower images 51', 51'' appear and are maintained in an adjacent configuration on a planar film media 51, only a single projector 50 is required to project the multiple image.

Rear projection screens 52A and 52B are spaced apart from the projector 50 and are disposed within the beam of projection of the projector 50. The rear projection screens 52A and 52B each provide an image forming surface to receive the corresponding two-dimensional image projected by the projector 50. Rather than two adjacent rear projection screens, a single screen could be used.

A first reflective member 53 is spaced apart from the projector 50 beyond and adjacent the rear projection screen 52A and a second reflective surface 54 is spaced apart from the projector 50 in juxtaposition to the first reflective member 53 beyond and adjacent to the rear projection screen 52B. The first reflective member 53 is both partly reflective and partly transmissive, which results from a partially silvered front surface. Thus, while image B formed on the rear projection screen 52B impinging on reflective member 53 reflects image B, image A formed on the rear projection screen 52A reflecting from the reflective member 54 is transmitted through the reflective member 53. Thus the reflective member 53 reflects image B and transmits image A. In order to carry out this procedure, the reflecting surfaces 53 and 54 are disposed at approximately 45 degrees with respect to the plane of images A and B formed on the projection screen 52A and 52B It should be apparent that the virtual images of the rear projection screens 52A, 52B are formed by the reflective members 53, 54.

In this example, it is preferable that the effect of reflection of the second reflective member 54 and that of transmission of the first reflective member 53 combine in such a manner so as to provide approximately equal light distribution. This may be achieved by using reflective members such that, for the first reflective member 53, light falling onto the silvered surface has characteristics whereby about 50% of the light is lost as it passes through and 40% is reflected. On the refraction side, that is, light coming toward the glass from the nontreated side, about 45% passes through and 55% is lost. A fairly good quality reflecting mirror for member 54 will reflect about 90% of what falls on it. The real image bounces off the top of the reflecting member 54 and is reduced to 90% of its original intensity. That image is then passed through the back side of the reflecting member 53 which reduces it to 45% of whatever comes to it. Thus 45% of 90% is 40%, the same intensity as the light of image B reflected from member 53. The intensity of the two images are approximately equal. Thus, even distribution is achieved without the necessity of absorbtion lenses.

A theatre viewing region 56 is provided for viewing the integrated images by an audience. The audience is separated from stray light of the projector 50 by an opaque light barrier 60. A third reflective member 58 is interposed between the viewing region 56 and the combined projected image of the film media 51 passed through the reflective member 53. The third reflective member 58 is partially reflective whereby the audience may view the combined projected image, but is also partially transmissive. This allows further combination with additional images which may be generated by a stage and props.

In order to do this, a stage turntable 62 is provided having a base 64, a lower rotatable platform 66, a cylindrical stage support 68 disposed centrally within the platform 66, and a cylindrical back 70 disposed above and centrally within the stage support 68. A circular platform 72 disposed on the stage support 68 supports props 74, and may support live actors. Additional props 76 are disposed on the lower platform 66.

A fourth partially transmissive reflective member 78 is disposed intermediate the props 74 behind the fourth reflective member 78. The fourth partially transmissive reflective member 78 allows both the images of the props 74 on the upper and lower platforms 66, 72 to be combined, passed through the third reflective member 58 where it is combined with the projected film image and passed to the audience. Fixed light sources 80, 82 directed on the props 74, 76 are provided to create suitable lighting for combination with the integrated three dimensional projected motion picture.

It is preferable that the fourth partially transmissive reflective member 78 be fixed and not rotatable with the turntable 62. This may be achieved by supporting the fourth reflective member by the sides apart from the turntable 62, thereby allowing a single fourth reflective member to be used, while various props may be rotated into proper registration for particular scenes. It should be noted that in order that the props 74, 76 create a properly aligned visual image, the light must be dimmed during rotation, and lit when moved into proper alignment for transmission of the proper visual image to the audience.

Thus, a system for visually displaying to a theatrical audience a three-dimensional motion picture integrated with live three dimensional images from both two and three dimensional sources has been described, which is moderate in cost, requiring only a single projection source, does not require additional filters to compensate for uneven light distribution from the two dimensional projection and can create versatile images for a significant audience.

I claim:

1. Apparatus for projecting to a theatrical audience a three dimensional image comprising:
   an image projection source for simultaneously projecting pairs of two dimensional visual images;
   media operatively engaged by the image projection source, the media defining sequentially disposed first and second adjacent planar images, the first and second adjacent planar images comprising pairs of displaced images of a scene;
   a theatrical viewing region;
   a first at least partially transmissive reflecting member disposed to create a virtual image of the first planar image;
   a second reflecting member disposed to create a virtual image of the second planar image, the second reflecting member oriented to transmit the second image through the first reflecting member, to thereby provide a combined image, the first and second reflecting members disposed to transmit the combined first and second planar images to the theatrical viewing region for viewing by a theatrical audience;
   a third partly transmissive reflecting member;
   a first prop arrangement disposed in spaced relationship to the third reflecting member, the third reflecting member disposed intermediate the theatrical viewing region the first prop arrangement, and intermediate along a line of sight from the second partly transmissive reflecting member to the viewing region; and
   means for lighting the first prop arrangement, whereby props may be lit and an image resulting from the lit props may be transmitted to the third reflecting member.

2. The invention as set forth in claim 1 and in which:
   the image projection source comprising a motion picture projector, the means for forming first and second planar images from the image projection source disposed remote from the motion picture projector and adjacent the first and second reflecting means; and
   the media comprising film media having a sequence of frames, each frame of which comprising a pair of adjacent film images representing the first and second visual images.

3. The invention as set forth in claim 1 and in which the first reflecting member having a light transmission factor of approximately 45% and a reflective factor of approximately 40%, and the second reflecting member having a reflective factor of approximately 90%, whereby the light intensity of the first image reflected by the first reflective member and the light intensity of the second image reflected by the second reflective member and then transmitted by the first reflective member are approximately equal.

4. The invention as set forth in claim 1 and comprising:
   a forth partly transmissive reflecting member disposed intermediate the first prop arrangement and the third reflecting member;
   the first prop arrangement disposed laterally beyond the fourth reflecting member;
   a second lighting arrangement;
   a second prop arrangement disposed beneath the fourth reflecting member, the second lighting arrangement disposed to illuminate the second prop arrangement.

5. The invention as set forth in claim 4 and comprising a turntable for supporting the first prop arrangement whereby props may be rotated into visual image alignment to provide an integrated image to the theatrical viewing audience of the first prop arrangement and the composite planar image.

6. The invention as set forth in claim 5 and in which the turntable having a second level for supporting the second prop arrangement, whereby props for different scenes may be rotated into a key alignment position with the fourth reflecting member, whereby props are in visual alignment with images transmitted through the fourth at least partially reflecting member, and a second level whereby props are in visual alignment with images transmitted through the fourth at least partially reflecting member.

7. A method for producing for a theatrical viewing audience in a theatrical viewing region a three-dimensional image from two-dimensinal image sources comprising the steps of:

providing a multiple image projection source of adjacent two-dimensional planar images to provide first and second adjacent projected planar images;

positioning a first reflecting member at an oblique angle across the plane of said first projected planar image, whereby a first virtual image of said first two-dimensional planar image is formed;

positioned at least a secodn reflecting member substantially adjacent sid first reflecting member at an oblique angle across the plane of the second projected planar image whereby a second virtual image of said second two-dimensional planar image is formed, the first reflecting member being at least partially transmissive;

orienting said first and second reflecting members with respect to each other to place said first and second virtual images in spaced parallel relation to one another, directing the second planar image reflected by the second reflecting member through the first reflecting member, thereby creating a composite image, and directing the first and second virtual images to the theatrical viewing region for viewing by an audience;

positioning a third reflecting member along a combined projected image of the first and second reflecting members;

orienting the third reflecting member to produce a combined image visible in the theatrical viewing region;

interposing the third reflecting member between an audience viewing region and a stage;

directing light on the stage;

orienting the third reflecting member to combine the composite two-dimensional images and an image through the third reflecting member from the stage to produce an integrated composite image visible by a theatrical viewing audience in the audience viewing region;

interposing a fourth partially transmissive reflecting member beyond the third reflecting member in advance of the stage;

lighting a lower prop region beneath the fourth reflecting member;

orienting the stage and the lower prop region to direct a three dimensinal image of the stage through the fourth partly transmissive reflecting member, and reflecting a three dimensional image of the lower prop region by the fourth partly transmissive reflecting member, thereby producing a combined visual image of the stage and the lower prop region; and orienting the fourth partially transmissive reflecting member to transmit the combined visual stage and prop image through the third partially transmissive reflecting members to the theatrical viewing region, to thereby provide a combined integrated image with the combined two dimensional planar projected image visible by a theatrical viewing audience.

8. A method for producing a three-dimensional image from two-dimensional image sources as defined in claim 7 further including the step of placing said second reflecting member intermediate said first reflecting member and said first image projection source.

9. A method for producing a three-dimensional image from two-dimensional image sources as defined in claim 8 further including the step of orienting said first and second image projection sources with respect to each other to place the first and second two-dimensional planar images in a common plane.

10. A method for producing a three-dimensional image from two-dimensional image sources as defined in claim 9 further including the step of displacing said first reflecting member from the plane of said first two-dimensional planar image by 45 degrees of arc.

11. A method for producing a three-dimensional image from two-dimensional image sources as set forth in claim 7 further including the steps of displacing said second reflecting member from the. plane of said second two-dimensional planar image by 45 degrees of arc and placing said second reflecting member in parallel spaced relation to said first reflecting member.

12. The method as set forth in claim 11 and in which the multiple image projection source is a single image projection source having a film media defining first and second images on adjacent frames; the method further comprising the step of orienting the transmission of the first and second images to correspondingly and substantially separately impinge on the first and second reflecting members.

13. Apparatus for projecting to a theatrical audience a three dimensinal image comprising:

an image projection source for simultaneously projecting pairs of two dimensional visual images in response to media defining sequentially disposed first and second adjacent planar images; the first and second adjacent planar images comprising pairs of displaced images of a scene;

rear projection screen means for providing an image forming surface, the rear projection screen means disposed in front of the image projection source;

a theatrical viewing region defining a region in which a significant number of individuals may be gathered as an audience for simultaneous viewing:

a first at least partially transmissive reflecting member disposed in front of the rear projection screen menas to create a virtual image of the first planar image;

a second reflecting member disposed in front of the rear projection screen means to create a virtual image of the second planar image;

the second reflecting member oriented to transmit the second image through the first reflecting member, to thereby provide a combined image, the first and second reflecting members disposed to transmit the combined first and second planar images to the theatrical viewing region for viewing by a theatrical audience and in which the first reflecting member having light transmission factor of approximately 45% and a reflective factor of approximately 40%, and the second reflective member having a reflective factor of approximately 90%, whereby the light intensity of the first image reflected by the first reflective member and the light intensity of the secod image reflected by the second reflective member and then transimtted by the first reflectie member are approximately equal.

14. The invention as set forth in claim 13 and in which the rear projection screen means comprises first and second rear projection screens, the first rear projection screen disposed adjacent the first reflecting member and the second rear projection screen disposed adjacent the second reflecting member.

15. Apparatus for projecting to a theatrical audience a three dimensional image comprising:
   an image projection source for simultaneously projecting pairs of two dimensional visual images in response to media defining sequentially disposed first and second adjacent planar images; the first and second adjacent planar images comprising pairs of displaced images of a scene;
   rear projection screen means for providing an image forming surface, the rear projection screen means disposed in front of the image projection source;
   a theatrical viewing region defining a region in which a significant number of individuals may be gathered as an audience for simultaneous viewing;
   a first at least partially transmissive reflecting member disposed in front of the rear projection screen means to create a virtual image of the first planar image;
   a second reflecting member disposed in front of the rear projection screen means to create a virtual image of the second planar image;
   the second reflecting member oriented to transmit the second image through the first reflecting member, to thereby provide a combined image, the first and second reflecting members disposed to transmit the combined first and second planar images to the theatrical viewing region for viewing by a theatrical audience
   a third partly transmissive reflecting member;
   a first prop arrangement disposed in spaced relationship to the third reflecting member, the third partly transmissive reflecting member disposed intermediate the theatrical viewing region and the first prop arrangement, and intermediate a line of sight from the second partly transmissive reflecting member to the viewing region; and
   means for lighting the first prop arrangement, whereby props may be lit and an image resulting from the lit props may be transmitted to the third reflecting member.

16. The invention as set forth in claim 15 and comprising:
   a fourth partly transmissive reflecting member;
   the first prop arrangement disposed laterally beyond the fourth reflecting member; disposed intermediate the first prop arrangement and the third partly transmissive reflecting member;
   a second lighting arrangment;
   a second prop arrangement disposed beneath the fourth reflecting member, the second lighting arrangement disposed to illuminate the second prop arrangement.

17. The invention as set forth in claim 16 and comprising a turntable for supporting the first prop arrangement whereby props may be rotated into visual image alignment to provide an integrated image to the theatrical viewing audience of the first prop arrangement and the composite planar image.

18. The invention as set forth in claim 17 and in which the turntable having a second level for supporting the second prop arrangement, whereby props for different scenes may be rotated into a key alignment position with the fourth reflecting member, the whereby props are in visual alignment with images transmitted throught the fourth at least partially reflecting member, and a second level whereby props are in visual alignment with images trasnmitted through the fourth at least partially reflecting member.

* * * * *